US 9,952,909 B2

(12) United States Patent
Martin

(10) Patent No.: US 9,952,909 B2
(45) Date of Patent: Apr. 24, 2018

(54) MULTIPLE SERVICE CLASSES IN A SHARED CLOUD

(75) Inventor: Jean-Christophe Martin, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 622 days.

(21) Appl. No.: 13/528,420

(22) Filed: Jun. 20, 2012

(65) Prior Publication Data

US 2013/0346493 A1 Dec. 26, 2013

(51) Int. Cl.
*G06F 15/16* (2006.01)
*G06F 9/50* (2006.01)

(52) U.S. Cl.
CPC .................................. *G06F 9/5077* (2013.01)

(58) Field of Classification Search
CPC ......... G06F 2009/4557; G06F 9/45558; G06F 9/5077; G06Q 10/0639; H04L 12/4641; H04L 29/08144
USPC ...................... 709/226; 718/1, 104
See application file for complete search history.

(56) References Cited

U.S. PATENT DOCUMENTS

| | | | |
|---|---|---|---|
| 2009/0070776 A1* | 3/2009 | Dahlstedt | G06F 9/5016 719/312 |
| 2009/0241030 A1 | 9/2009 | von Eicken et al. | |
| 2010/0083145 A1* | 4/2010 | Schang et al. | 715/760 |
| 2011/0243553 A1* | 10/2011 | Russell | 398/25 |
| 2012/0137285 A1* | 5/2012 | Glikson et al. | 718/1 |
| 2012/0185913 A1* | 7/2012 | Martinez et al. | 726/1 |
| 2013/0311778 A1* | 11/2013 | Cherukuri et al. | 713/171 |
| 2013/0326515 A1* | 12/2013 | Hara et al. | 718/1 |
| 2013/0339200 A1* | 12/2013 | Banerjee et al. | 705/30 |

* cited by examiner

*Primary Examiner* — Shean Tokuta
(74) *Attorney, Agent, or Firm* — Maschoff Brennan

(57) ABSTRACT

In various exemplary embodiments, a system, article of manufacture, and method for providing, a cloud computing infrastructure on a system infrastructure comprising, a first virtual computing environment associated with a first class of service, the first class of service defining, in one embodiment, a first set of obligations, restrictions, and/or capabilities; providing, in the same cloud, a second virtual computing environment associated with a second class of service, the second class of service defining a second set of obligations, restrictions, and/or capabilities different from those of the first class of service; and executing the first virtual computing environment according to the first class of service and the second virtual computing environment according to the second class of service, the first virtual computing environment having a different access to the hardware platform than the second virtual environment based on the respective class of service.

15 Claims, 10 Drawing Sheets

MULTIPLE SERVICE CLASSES IN A SHARED CLOUD

TECHNICAL FIELD

The present application relates generally to the field of computer technology; and, in a specific exemplary embodiment, to a system and method of providing multiple classes of service within a cloud on a shared system infrastructure.

BACKGROUND

Cloud computing is new paradigm where compute, network, and storage resources are offered as services accessed over a network. Traditionally, the resources offered within a cloud are implemented through some abstraction or virtualization of physical resources. While traditional clouds are multi-tenants, which mean that the same infrastructure is used to provide resources to multiple tenants, each tenant is offered the same set of services capabilities, and service level agreements (SLA). Today, the implementation of multiple service capabilities or SLA, requires the implementation of effectively multiple separate cloud computing environments, offering resources from different infrastructure. The latter is especially true if service capabilities or SLA require specific infrastructure capabilities, or pose specific restrictions on capabilities offered.

BRIEF DESCRIPTION OF DRAWINGS

Various ones of the appended drawings merely illustrate exemplary embodiments of the present invention and must not be considered as limiting its scope.

DETAILED DESCRIPTION

Figure 1:
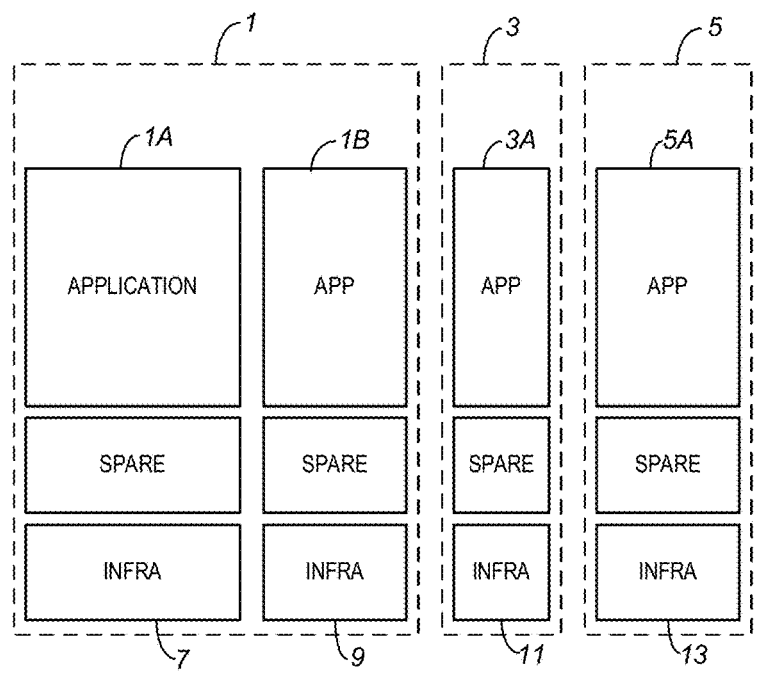
FIG. 1 depicts an exemplary block diagram of a plurality of traditional physical computer system environments used for classes of service.

The description that follows includes illustrative systems, methods, techniques, instruction sequences, and computing machine program products that embody the disclosed subject matter. In the following description, for purposes of explanation, numerous specific details are set forth in order to provide an understanding of various embodiments of the subject matter. It will be evident, however, to those skilled in the art that embodiments of the subject matter may be practiced without these specific details. Further, well-known instruction instances, protocols, structures, and techniques have not been shown in detail.

As used herein, the term "or" may be construed in an inclusive or exclusive sense. Similarly, the term "exemplary" may be construed merely to mean an example of something or an exemplar and not necessarily a preferred means of accomplishing a goal. Additionally, although various exemplary embodiments discussed below focus on an existing enterprise in a business environment, the embodiments are merely given for clarity in disclosure. Thus, any type of enterprise system such as a governmental system (including schools, court houses, and other judicially-related systems, etc.), religious, or any other non-business environment, is considered as being within a scope of the disclosed subject matter. Further, an internal cloud structure or internal cloud computing infrastructure is provided merely for clarity. Any cloud structure or cloud infrastructure may be located remotely to an enterprise and is still to be considered as being within a scope of the present invention.

A class of service may be viewed as capturing aspects of a cloud environment usually implemented through specific infrastructure or service design (e.g. physical isolation) or through processes and policies. These aspects can generally be grouped in at least three categories:

Obligations: The rules, policies, and methods of implementation to be satisfied in order to be allowed in a given class of service.

Restrictions: The set of rules and policies defining what is permitted within a given class of service.

Capabilities: The set of services or features available to a given class of service.

The implementation of policies as they relate to classes of service may use network mechanisms, like network quality of service (QOS), to implement restrictions or capabilities. However, this constitutes only an implementational example.

The sum of policies as they relate to classes of services can also be exposed to users of the cloud through the definition of Service Level Agreements. However, the SLA represents only one method to describe obligations, restrictions, and capabilities. In a domain under discussion, we can take the example of two classes of service: External and Secure.

The External class of service could have the following characteristics (not exhaustive):

Obligations: Users are responsible for the administration of the applications.

Restrictions: Machines are not allowed to access the provider's private production network.

Capabilities: Machines are allowed access to and from the Internet, users have root access.

The Secure class of service could have the following characteristics:

Obligations: Applications need to be vetted, and pass security tests.

Restrictions: Services can only be accessed through a particular port (for example port 443) through a Secure Socket Layer (SSL). Only System Administrators have login privileges.

Capabilities: Applications can be Payment Card Industry (PCI) compliant; Applications may have access to secure databases a provider's network.

There is no exhaustive list of what is considered an obligation, restriction, or capability. This may be defined as the features of a cloud improve. Also, the capabilities or restrictions can see their implementation evolve. In a first implementation, one may use physical isolation to implement network-related restrictions.

In an embodiment various classes of service are logical concepts (and not a different implementation or instance). A cloud may have a plurality of virtual environments, each offering one class of service. However, associated with the cloud there may be different classes of service associated with the various virtual environments but a virtual environment usually offers only a single class of service.

In an exemplary embodiment, system architecture to provide cloud computing having a plurality of classes of service is disclosed. The system architecture comprises a cloud communications interface and an infrastructure communications interface. A cloud structure is communicatively coupled to the cloud communications interface and the underlying infrastructure communications interface, with the cloud structure arranged to be coupled through the cloud communications interface to users, which may be individual users or business units. The cloud structure is further arranged to be coupled through the infrastructure communications interface to the underlying system infrastructure resources.

As disclosed, a cloud may be a plurality of virtual environments. Virtualization is the preferred method to implement multiple virtual environments with different classes of service, on top of a shared infrastructure which could be viewed as compute, network, and storage resources. Compute resource virtualization may be viewed as a technique used to provide a virtual computer environment, namely one that is a simulation of underlying hardware. Virtualization provides that salient features of the underlying system infrastructure be reflected into one of several virtual environments. These features may include an instruction set, input/output operations, interrupts, memory access, and whatever other elements are used by the software that runs on a basic machine, and that are intended to run in the virtual environments. In such environments, software capable of execution on the infrastructure can be run in the virtual environment including, in particular, operating systems. Network virtualization may be viewed as the process of combining hardware and software network resources and network functionality into a single, software-based administrative entity, a virtual network. Network virtualization involves platform virtualization, often combined with resource virtualization. Virtualization is discussed in more detail with respect to FIG. 8.

The user of the cloud may specify a class of service. By providing a method for the users of the cloud to specify a class of service for their environments, the capabilities of the underlying computer infrastructure can be tuned to implement the different classes of services (e.g., External or Secure). A further optimization is to implement these different classes of service in a logical way, on top of a shared infrastructure. The infrastructure is therefore not only multi-tenant, but also multi-class of services. This means that the infrastructure, and the services used by the cloud users, not only isolate projects or environments between each other, but also provide differentiated services to different users based on the requested class of service, while network differentiated services apply only to network capabilities. The described embodiments are defining aspects of the cloud features through the concept of class of service. Stated another way, the user, which may be an individual or a business entity with logical users, is creating a virtual environment and is requesting a specific class of service. This may have been specified to him/her previously based on how they plan to use the environment. Subsequent requests for resources in that environment will be made with this class of service. Based on the class of service assigned/selected, the user may be asked more questions either at the environment creation time, or at the resource request time. The system may also automatically perform additional checks, or behave differently depending on the class of service specification.

In general, an embodiment provides a cloud manager system (CMS) that may be coupled to a computer system infrastructure. The infrastructure may have a system operating system (system OS), sometimes referred to as a host operating system. A virtual environment (VE) running at least one application via a virtual operating system may be connected to the CMS. Both the system OS and the CMS have separate operating contexts and may have joint address spaces, but both may be co-resident at the system level. A CMS is software orchestrating and managing the life cycle of resources such as network, compute, and storage. These resources are either physical or virtual. A user, would access the CMS to request these resources. Depending on the class of service (COS) selected, the CMS will configure, allocate, or organize the requested resources such that the obligations, restrictions, and capabilities are offered accordingly. Following this request, the user will have access to the requested resources. If a requested resource was a compute resource, the user will be given access to the operating system exposing this compute resource. This operating system may run directly on a physical machine (e.g., bare metal hardware) or on top of a hypervisor. In the latter case, the CMS may have configured and allocated physical resources through the hypervisor in compliance with COS requirements. This is however, only one way of a number of ways to implement COS requirements. In another exemplary embodiment, a processor-readable storage medium storing an instruction that, when executed by a processor, causes the processor to perform a method to integrate a cloud structure in an enterprise environment with a plurality of resources is disclosed. The method comprises establishing a service communications interface between the cloud structure and individual users and/or business units within the enterprise environment, and establishing an infrastructure communications interface between system infrastructure resources and the cloud structure.

With reference to FIG. 1, in a traditional method, a plurality of isolated physical environments may be provided. If a High Performance Computing cloud, or a PCI compliant Cloud, or a Virtual Private Cloud, is required, a new physical environment is created, with different capabilities and controls. Applications within each physical environment can be considered a "virtual environment" and may be isolated from each other. These environments are all sharing the same class of service (obligations, restrictions, capabilities). Users of these clouds themselves may create different class of service, but this would be without the support of the cloud provider. If company A uses cloud provider X, they would put their QA and production applications in the same account provided by cloud provider X, optionally in a different project. However, from the point of view of cloud provider, the two projects will be sharing the same infrastructure and be offered the same SLA. This can be seen with continued reference to FIG. 1. Elements 1, 3, and 5 are physical environments, with a different network of computer infrastructures 7, 9, 11, 13 (abbreviated "INFRA" due to space) with potentially a different physical realization, as well as a set of dedicated resources of the underlying infrastructures. Tenants 1A, 1B, each run an application, on the physical infrastructure, here 7, 9. If tenants need strong isolation, they may be moved to their own physical environment much like class of service represented by 3A and 5A within physical environments 3, and 5, respectively. Physical environments, 1, 3, and 5 may be used to implement different classes of service, by creating new physical environments as a mechanism to implement the obligations, restrictions, and capabilities.

Figure 2:
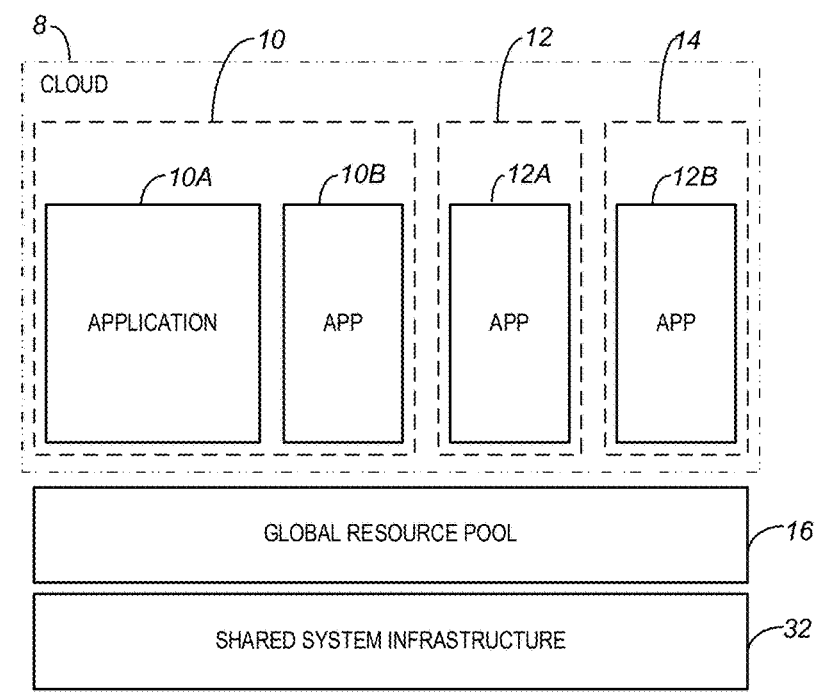
FIG. 2 depicts an exemplary block diagram of a cloud that may have various classes of service and which uses the same shared computer system infrastructure.

FIG. 2 depicts an exemplary block diagram of a cloud which may have various classes of service and use the same shared computer system, network, and storage infrastructure. It may be useful to view a "cloud infrastructure" as being generally composed on multiple resource types, for example: computer systems, network elements, network devices, and storage devices. A "multi-tenant cloud infrastructure" may be viewed as a cloud infrastructure shared by multiple tenants. One embodiment described herein is an extension of a multi-tenant cloud infrastructure where multiple classes of services can be offered to a tenant on top of the same "cloud infrastructure." The realization of the embodiment described in the foregoing sentence uses methods to implement restriction, obligations and capabilities. That is, there is one cloud and various classes of services within the cloud. Cloud 8 comprises virtual environments 10, 12, and 14, each of which belongs to, or is associated with, only one class of service. In one embodiment, virtual environment 10 includes two applications 10A and 10B, which may belong to two different users. Alternatively, the two applications 10A and 10B may be considered as belonging to the same logical user. It could be that the environment is owned by an organization that has multiple applications, developed by multiple users. The two applications are not isolated from each other in that case, as they are part of the same environment and class of service. In another embodiment, there may be, for example, two virtual environments in the same class of service, which is a common use case. In this use case, there may be multiple organizations, each one owning its own virtual or logical environment, with the same QA or Production class of service, for example.

There may, in general, be N virtual environments in a cloud, each associated with a class of service. There may be M classes of services in a cloud. Usually N is greater, and often much greater, than M. In FIG. 2 only three virtual environments 10, 12, 14 are shown for ease of illustration. However, in a given embodiment there may be hundreds of virtual environments and perhaps four or five classes of service, depending on the underlying infrastructure 32 and the requirements and choices of the person who automates the underlying infrastructure 32.

Each virtual environment may have shared or dedicated resources. A virtual environment's dedicated resources are virtual resources created by a CMS that virtualizes the virtual embodiment with respect to the underlying infrastructure. Shared resources, on the other hand, are physical resources that are shared from global resource pool 16 of FIG. 2 between or among virtual environments, as discussed in more detail subsequently.

Figure 3:
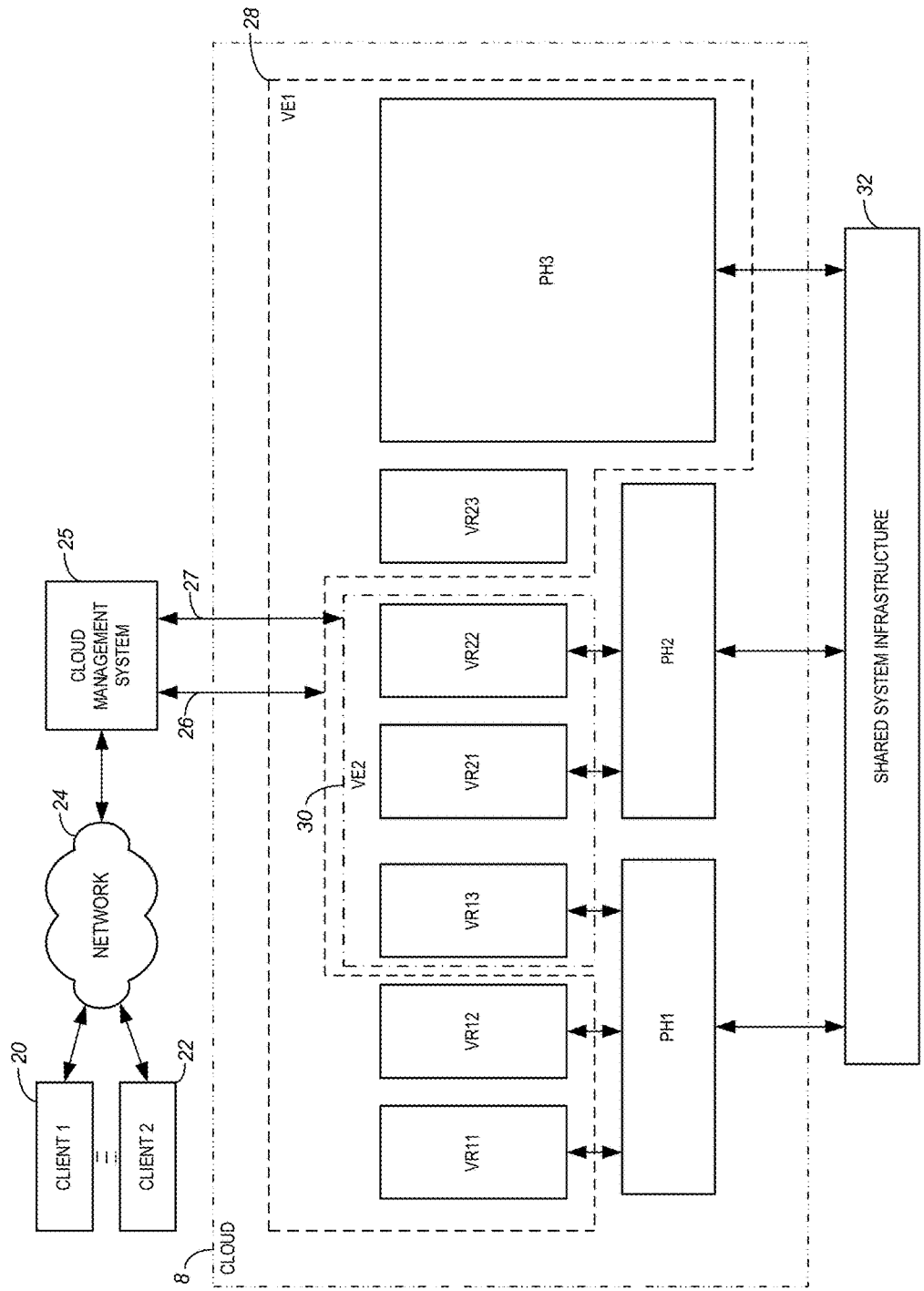
FIG. 3 depicts a block diagram of a cloud having a plurality of virtual environments and a plurality of classes of services.

FIG. 3 illustrates a block diagram of a cloud having a plurality of virtual environments and a plurality of classes of services. One or more clients 20, 22 are coupled by way of network 24, which may be the Internet, to cloud management system (CMS) 25. Cloud 8 comprises virtual environments 28 and 30. As above, only two virtual environments are shown for ease of illustration but there could be literally hundreds virtual environments if desired. Virtual environment 28 includes dedicated virtual resources VR11, VR12, and VR23. Virtual environments 28 (by way of VR11 and VR12), and 30 (by way of VR13) share physical resource PH1. In cloud 8, virtual environments VR21 and VR 22 share physical resource PH2. The physical resources may include physical assets, software assets, and traditional processes discussed in more detail below. Physical resources like PH1 and PH2 are virtualized. Only VR* resource are part of Virtual Environments VE1 and VE2. PH1 and PH2 are part of the cloud 8 managed by CMS. On the other hand, PH3 is a physical resource part of VE1, but it is still part of cloud 8. Physical resources like PH1 and PH2 are virtualized.

Figure 4:
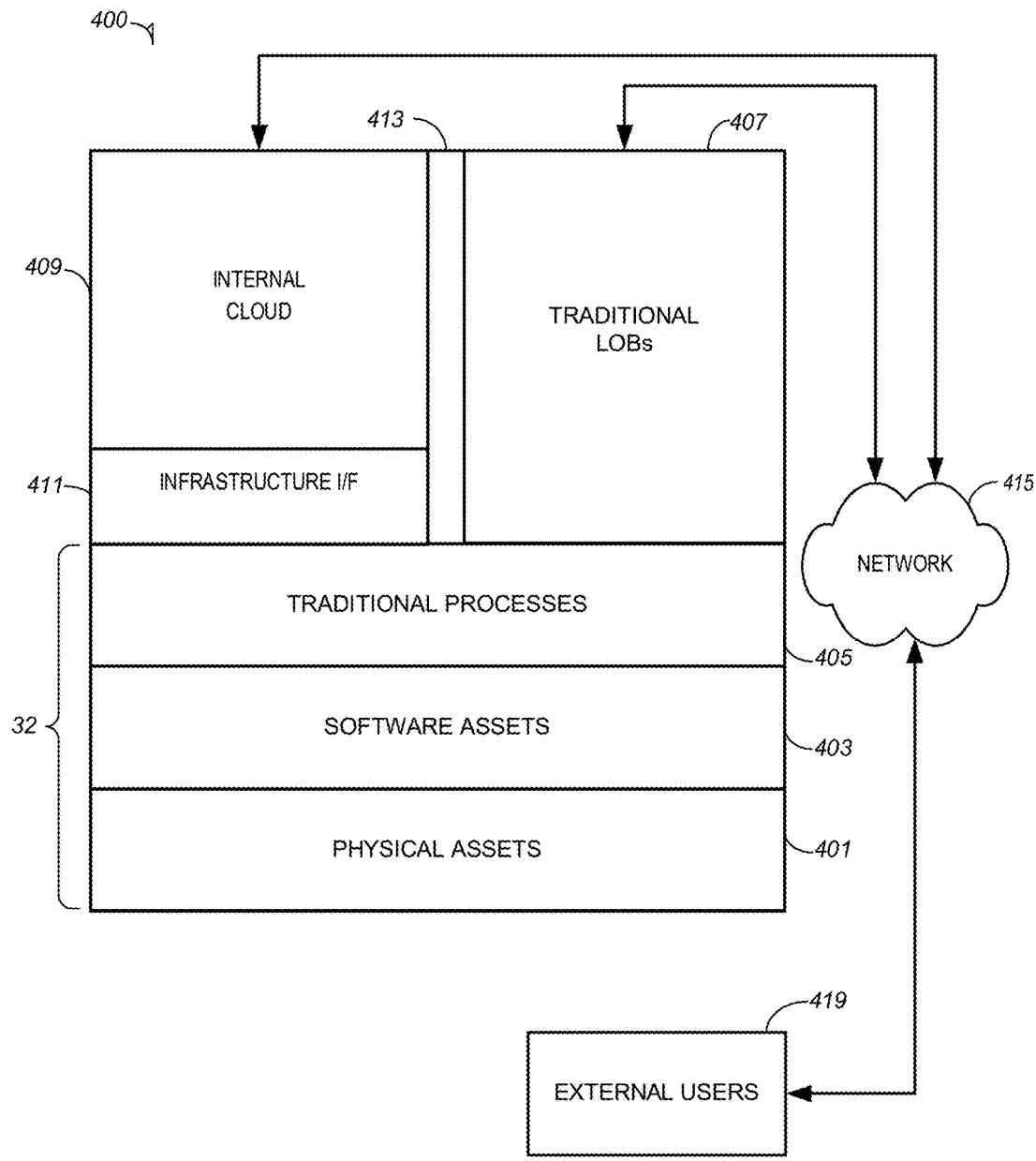
FIG. 4 depicts an exemplary block diagram of an integration of a cloud infrastructure into a pre-existing computer system.

With reference to FIG. 4, an exemplary block diagram 400 of an integration of a cloud infrastructure into a pre-existing computer system includes infrastructure 32 originally seen in FIG. 2. The infrastructure may include a physical asset layer 401, a software asset layer 403, and a traditional processes layer 405. The infrastructure 32 may, in general, may also include people, processes, technology, information, and a host of other tangible and intangible assets associated with a business enterprise.

Traditional lines of business (LOBs) 407 include, for example, individual business units, individual product lines, an auction site accessible externally to a plurality of users outside the enterprise, or a plurality of peripheral external business groups. The business groups may be located within an overall enterprise structure, or, alternatively, may remotely be located in various parts of the world, or combinations thereof.

An internal cloud 409 may be physically located within the overall enterprise structure, or may at least partially be located remotely. The internal cloud 409, sometimes viewed as an internal cloud computing infrastructure, includes various systems and subsystems (not shown but understandable to a skilled artisan), such as application services and platform services. These may be shared physical resources such as PH1, PH2, PH3 seen in FIG. 3 shared by well known resource sharing applications. Also provided may be dedicated resources VR11-VR13, VR21, VR22, and VR23. These dedicated resources may be provided by virtualization as discussed below with respect to FIG. 8. The application services include services such as the creation of a cloud account, the deployment of applications, the closure of cloud accounts, and initialization and termination of resource collections. The platform services include, for example, monitoring of resource collections, management of capacity policies, addition of cloud capacities, and other services.

The internal cloud 409 interfaces to the shared infrastructure 32 (originally seen in FIG. 3) through an infrastructure communications interface (I/F) 411. The infrastructure communications interface 411 may be comprised of a hardwired interface, a wireless communications interface, or a hybrid combination of the two. Further, the internal cloud 409 may be interfaced to the traditional line of businesses 407 through a service communications interface (not shown). As with the infrastructure communications interface 411, the service communications interface may also be comprised of, for example, a hardwired interface, a wireless communications interface, or a hybrid combination of the two.

With continued reference to FIG. 4, the internal cloud 409 and the traditional line of businesses 407 may be coupled to the network 415, which may be the Internet. The Internet 415 could also be another type of network. In the exemplary block diagram 400, the network 415 may be further coupled to a plurality of third-party cloud computing providers if desired. Further, both the internal cloud computing infrastructure 409 and the traditional lines of businesses 407 may be accessible by a plurality of external users 419 through the Internet 415. The plurality of external users 419 may be, for example, customers purchasing products or placing a bid at an auction site, both part of the traditional line of businesses 407.

Resources within the physical asset layer 401 (e.g., such as existing computers, network systems, telecommunications systems, and other hardware), and the software asset layer 403 (e.g., software running on and within existing computers and telecommunications systems), may all work with the internal cloud 409 through the infrastructure communications interface 411. Additionally, each of the traditional line of businesses 407 can access all capabilities of the internal cloud 409 through the service communications interface 413. Thus, the traditional line of businesses 407 and the internal cloud 409 may separately access the plurality of resources of the system infrastructure 32, either individually or concurrently.

Moreover, the internal cloud 409 may be configured to separately bill for services. Each department or business unit within the traditional line of businesses 407 may be billed for usage time. Billing is readily achievable, since both the internal cloud computing infrastructure 409 and the traditional line of businesses 407 are linked to be traditional processes layer 405. The traditional processes layer 405 is discussed in detail below, and may include functions such as asset management and accounting. Further, each of the traditional line of businesses 407 may be back-charged for items such as depreciation of the internal cloud computing infrastructure 409 based on usage levels.

Figure 5:
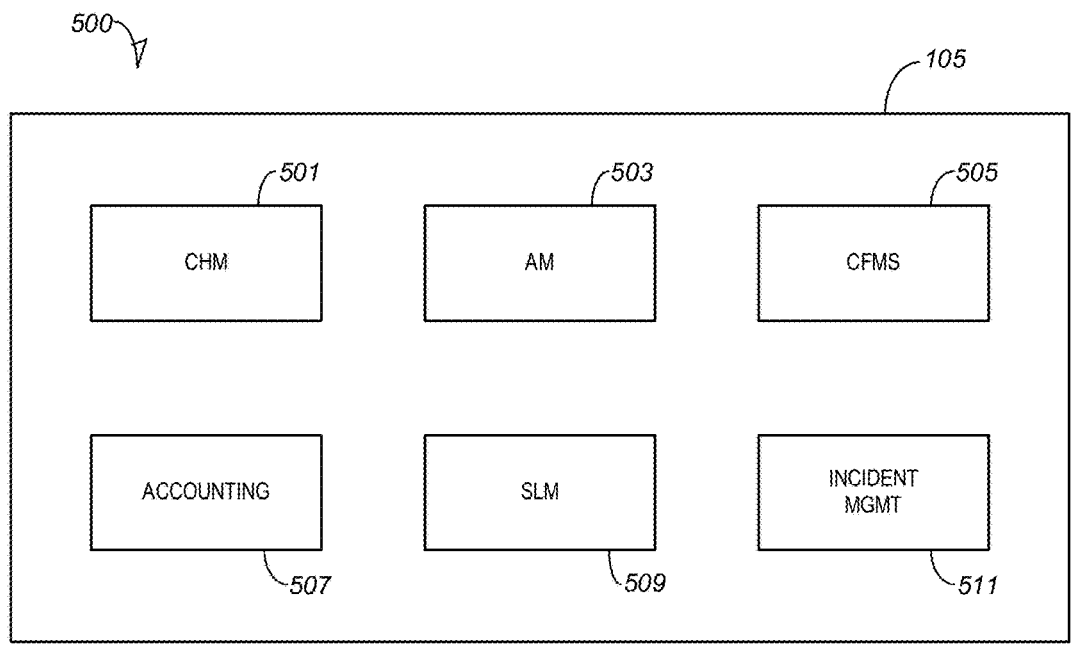
FIG. 5 depicts details of exemplary traditional processes in the pre-existing computer system of FIG. 4.

Referring now to FIG. 5, an embodiment 500 of the traditional processes layer 405 of FIG. 4 includes a change management group (CHM) 501, an asset management (AM) group 503, a configuration management service (CFMS) group 505, an accounting group 507, a service level management group (SLM) 509, and an incident mgmt group 511. The traditional processes layer 405 or other portions of the computer infrastructure 32 of FIG. 4 may also include, for example, virtualized central processing units (CPUs), e-Commerce Virtual Appliances (eVAs), storage units, databases, and load balancers. Additionally, a skilled artisan will appreciate that resources may have several states, such as a performance state, an operational state (e.g., up or down), an administrative state (e.g., system administrator check, and DEBUG), and a configuration state (e.g., pending What It Should Be (WISB), audited WISB, and delta between What It Really Is (WIRI) and WISB).

Each of these aforementioned groups may be equivalent to traditional groups typically encountered in a business enterprise. The groups may each include separate or overlapping people, processes, technology, and information. As noted above, each of these groups is accessible independently or concurrently by the internal cloud 409 and the traditional line of businesses 407 of FIG. 4.

Figure 6:
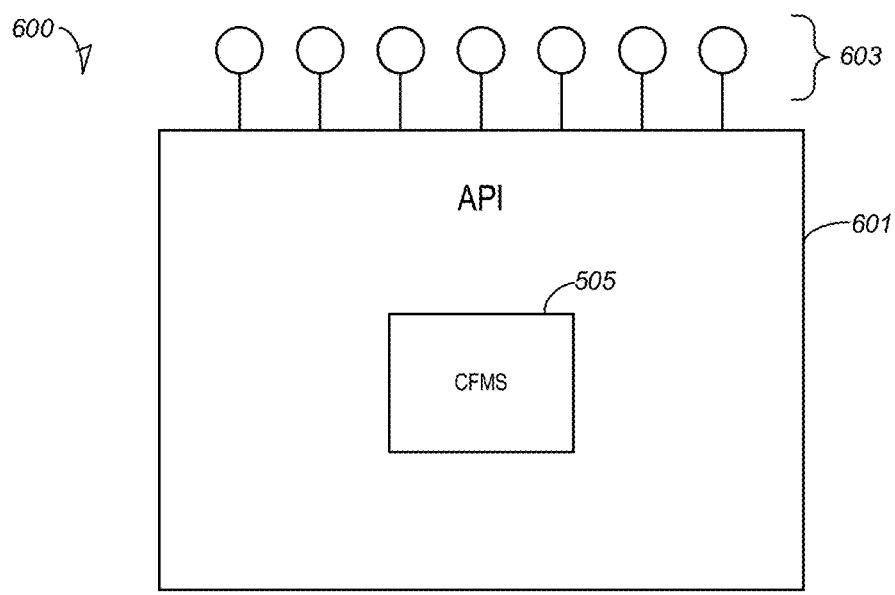
FIG. 6 depicts a block diagram of an exemplary application programming interface that may be coupled to one of the components contained within the traditional processes of FIG. 5.

FIG. 6 depicts a block diagram of an exemplary application programming interface to one of the components contained within the traditional processes. In FIG. 6, an exemplary embodiment 600 of the configuration management service (CFMS) group 505 of FIG. 5 is shown "wrapped" in an exemplary application programming interface (API) 601 with access the internal cloud 409 of FIG. 4, the traditional line of businesses 407, to other groups, and to other layers through a simplified communications interface 603. Thus, in this specific exemplary embodiment, the configuration management service group 505 may be considered to be a piece of hardware, or alternatively, a hardware/software combination.

Figure 7:
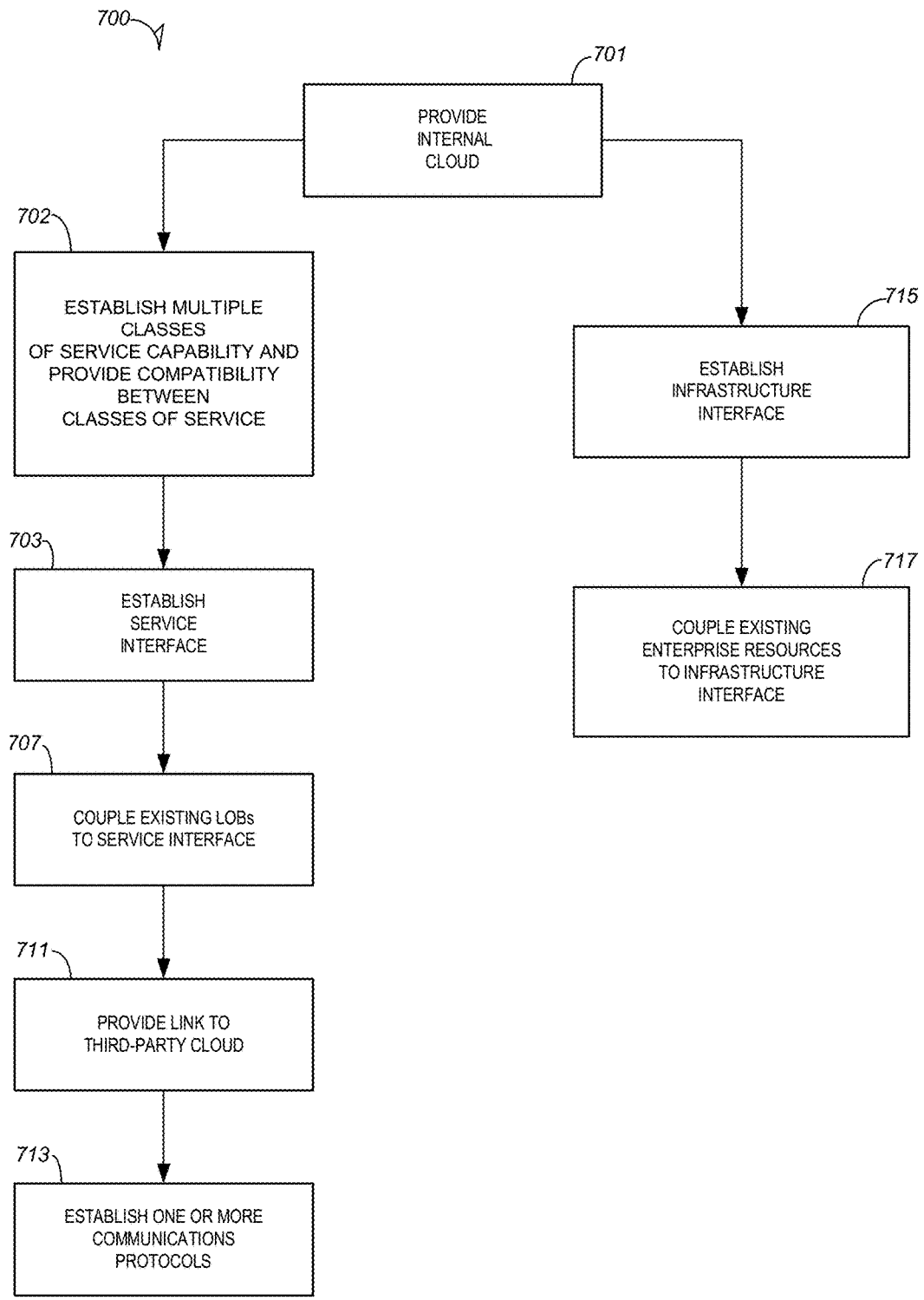
FIG. 7 depicts a flow diagram of a general overview of an exemplary method, for the integration of the cloud of FIG. 4.

With reference now to FIG. 7, a flowchart 700 provides an overview of an exemplary method for integrating the internal cloud 409 (FIG. 4) into a shared system infrastructure 32 of FIG. 4. The exemplary method includes providing an internal cloud 701, establishing multiple classes of service capability and providing compatibility among classes of service 702, as more fully discussed with respect to FIG. 9A, establishing a service interface 703, establishing an infrastructure interface 715, coupling an existing line of businesses to the service interface at 707, and coupling resources of the computer infrastructure 32 of FIG. 4 to the infrastructure interface as at 717. Once the existing line of businesses and resources of the computer infrastructure 32 (FIG. 4) have been coupled to their respective interfaces, the internal cloud computing infrastructure is integrated into the business enterprise. Optionally, the exemplary method may also include providing a link to a third-party cloud (not shown) as at 711, and establishing one or more system-wide communications protocols 713. The system-wide communications protocols may be any type of communications protocol known independently in the art.

Virtualization

In some embodiments for creating the virtual environments, a device emulator may be installed to be operatively connected to the system OS of the shared infrastructure. The CMS (which is at the system level) is able to issue what are known as "remote procedure calls" to a device emulator (which is at the user level) via a driver, which may be loaded as a conventional device driver into the system OS. That is, the device emulator accepts commands stored in memory by the CMS via a driver and processes these commands. The emulator also issues host operating system calls thereby accessing the physical system devices via the system OS.

Figure 8:
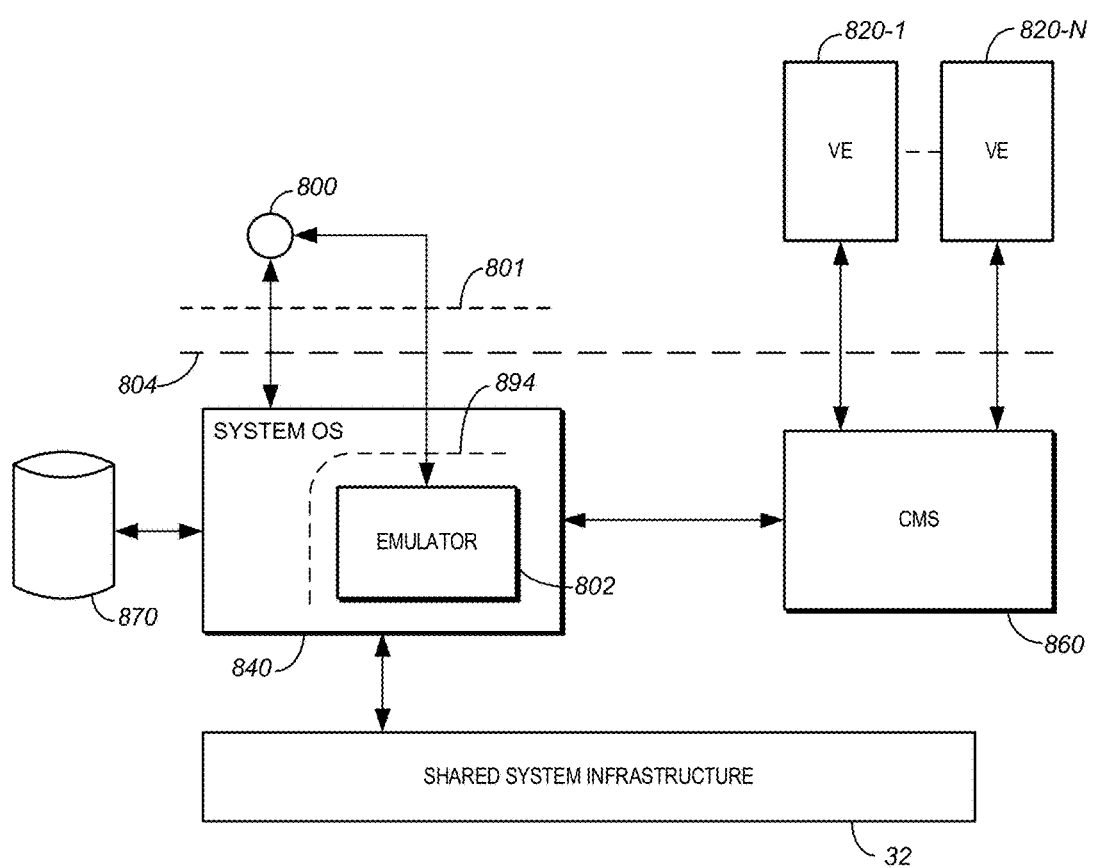
FIG. 8 depicts an architecture for providing a plurality of virtual environments using resources of an underlying system infrastructure.

FIG. 8 depicts architecture for providing a plurality of virtual environments using resources of an underlying system infrastructure. In this virtualizing embodiment, the CMS and system OS, as in the embodiment alluded to next above, may co-exist at the system level with different contexts. The separation between the system and user levels is indicated in FIG. 8 by the dashed line 804. In the embodiment of FIG. 8 there is a small shell application 800 at the user level, and a device emulator 802 is within the system OS 840 itself instead of operatively connected to it. In essence, the emulator 802 may be a combination of a driver and emulator. The shell application 800 initiates calls from its user level to the system OS 840. To the extent that the system OS allows calls that cross the driver API 894, then the system-level emulator 802 may be designed to speed up the system by reducing the number of necessary crossings of the application API 801. This potential increase in speed, however, may require that the code downloaded into the system OS becomes larger and more complex. Also, the system is less portable and general, because it is much more closely tied to the particular system OS. In the preferred embodiments, a driver is downloaded into the system OS 840. This driver provides for the good flexibility, portability and generality, but it is not strictly necessary. Instead, the driver may be pre-loaded into or even made an integral part of the system OS. This might be desirable, for example, if the producers of the system OS expect their customers to want to use this implementation to run one or more CMSs 860 at system level, co-resident with the system OS to manage the virtual environments of the cloud by providing management for the call responses from the system OS to the calls from the virtual environments 820-1 to 820-N, resulting in the dedicated resources for the virtual environments.

Figure 8A:
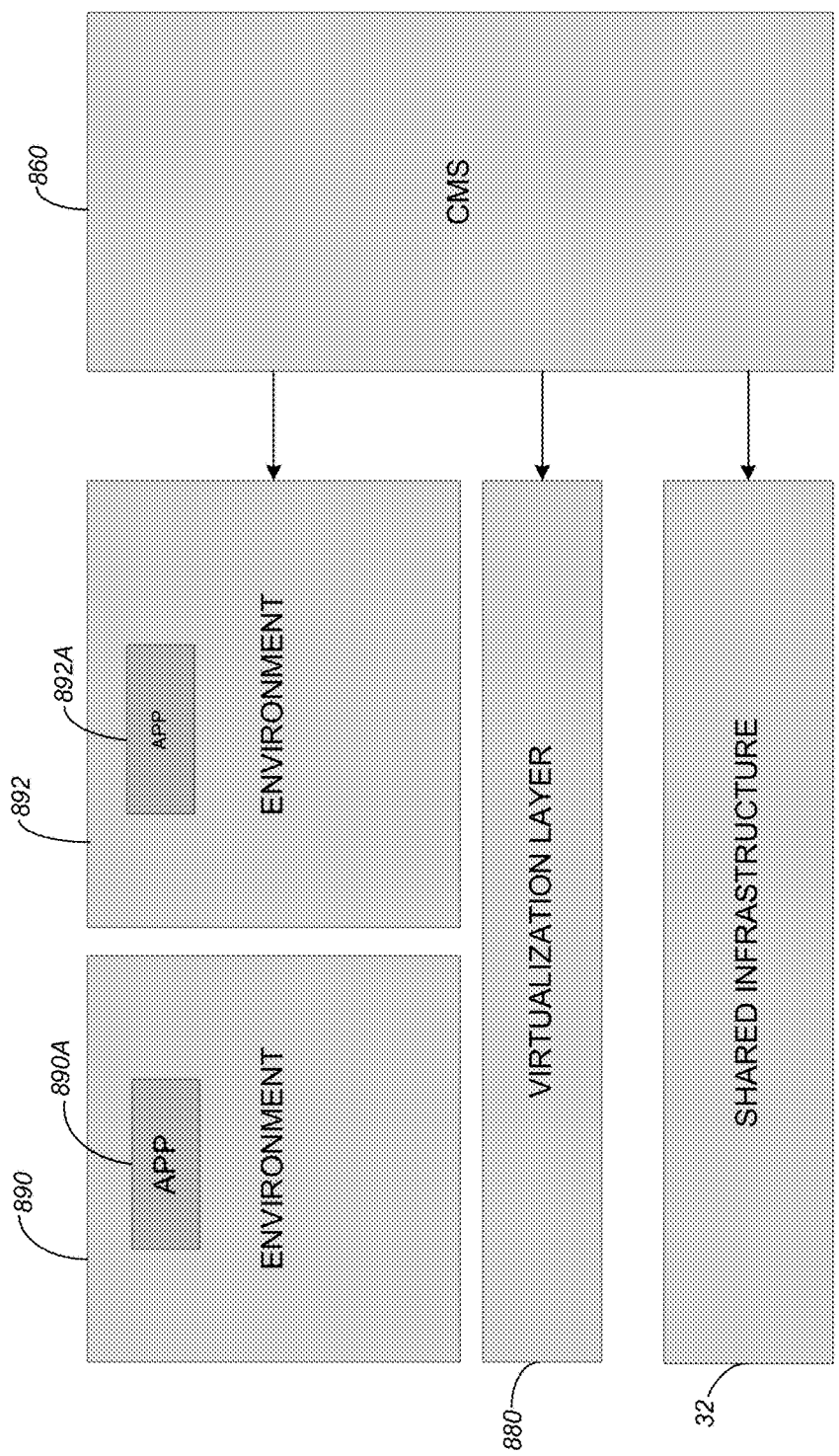
FIG. 8A depicts the embodiment of FIG. 8 illustrating virtualization in greater detail.

FIG. 8A may illustrate the embodiment of FIG. 8 more clearly in terms of virtualization. The shared infrastructure 32 is exposed to users, and applications 890A, 892A, through a virtualization layer 880. This virtualization layer is similar to what is referred to as System OS 840 in FIG. 8. Virtualization layer 880 implements the obligations, restrictions, and capabilities offered by the cloud. These implementations go beyond traditional computer system virtualization implemented by hypervisors, but includes it. The virtualization layer 880 also includes network virtualization, as well as storage virtualization.

Figure 9A:
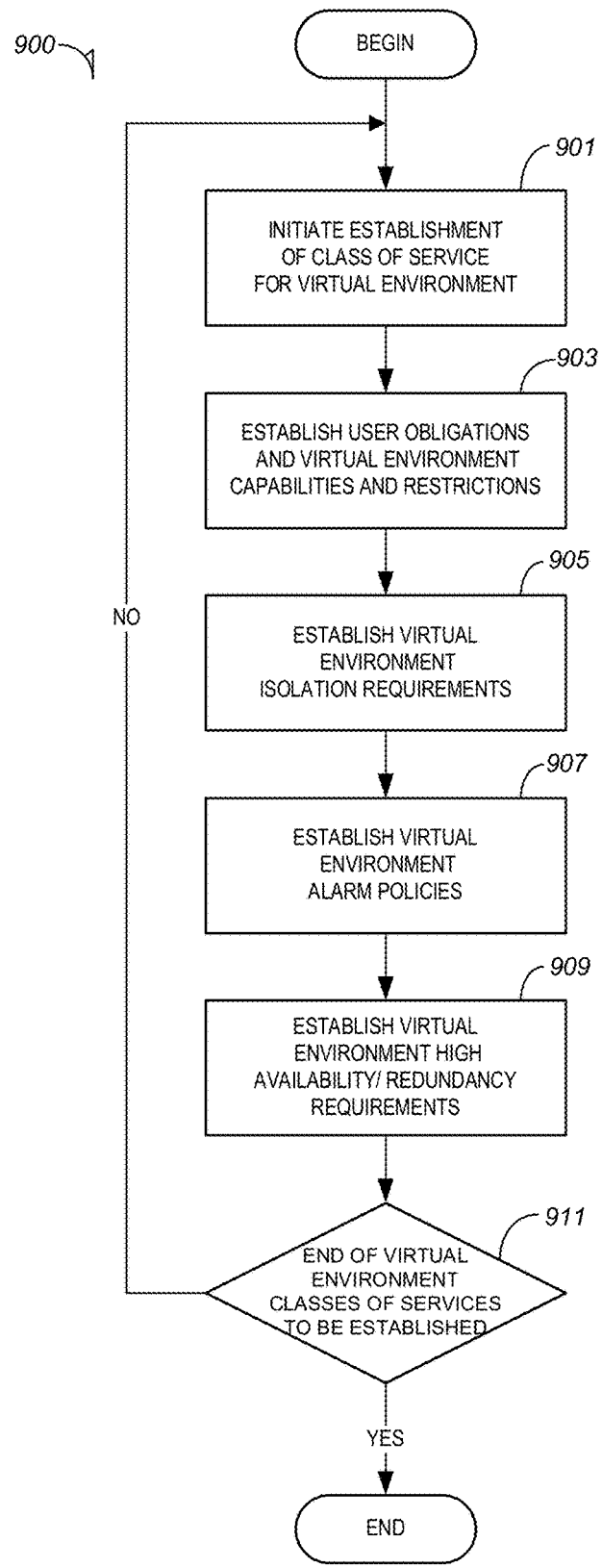
FIG. 9A depicts a flow diagram of a general overview of an exemplary method, in accordance with an exemplary embodiment, of establishing multiple classes of service in a cloud.

Turning now to FIG. 9A, there is illustrated a flow diagram 900 of a general overview of an exemplary method, in accordance with an exemplary embodiment, of establishing multiple classes of service in a cloud. This is illustrated, in this figure, as establishing various classes of services for various virtual environments within the cloud. As discussed briefly above, a cloud comprises one or more virtual environments, each virtual environment associated with only one class of service. There may be N classes of service and M virtual environments with M usually being much larger than N.

Continuing with respect to FIG. 9A, at 901, configuration management system CFMS 505 of FIGS. 5 and 6 initiates a class of service for a virtual environment. At 903, CFMS 505 establishes user obligations discussed above, and capabilities and restrictions for the virtual environment, also as discussed above. That is, user obligations are the rules and policies required to be satisfied by the user in order to be allowed in a given class of service. Restrictions are the set of rules and policies that define what is permitted within a given class of service. Capabilities are the set of services or features available to a given class of service. For example, if the implementation of a given class of service restriction, or capability, requires a specific physical restriction or capability, this restriction or capability can be indicated by flagging physical resources with a specific capability for sharing or, as discussed with respect to FIG. 8, for virtualizing the appropriate virtual resources with the appropriate restriction(s) and one or more capabilities.

At 905 the virtual environment isolation requirements are established. For example, some classes of service will allow any member from any virtual environment associated with this class of service to communicate with each other, but some other class of service may automatically restrict communication within the same virtual environments, even between two virtual environments in the same class of service.

At 907 alarm policies for the virtual environment are established. For example, a class of service may drive the routing of alerts and alarms for the service with the right priority. For example, a production class of service resource may be monitored by a network operations center controlling the cloud, while a QA resource may not need to be monitored, or not monitored as closely, as a production class of service.

At 909, the availability requirements, such as high availability, and redundancy requirements are established and implemented. For example, some classes of service require higher redundancy levels to ensure higher SLA. The system, such as by Configuration Management System CFMS or Cloud Management System CMS, or another appropriate system component, may automatically change the deployment infrastructure to provide enough redundancy for an application, in, for example, a production class of service.

At 911 a test is performed to determine whether the system has reached the end of the classes of services to be established. The classes of service to be established may be listed in a table in a storage and stepped through, each for implementation in accordance with the method of FIG. 9A. If the system has reached the end of the classes of service to be established, the method ends. If not, the method begins again at 901 to establish the next class of service. In each case, only one class of service will be established for a given virtual environment. A virtual environment may have multiple class of service, it would depend on the definition of a virtual environment. The key to various embodiments is not so much the association of virtual environment with class of service, but more about supporting multiple class of service on shared infrastructure.

Figure 9B:
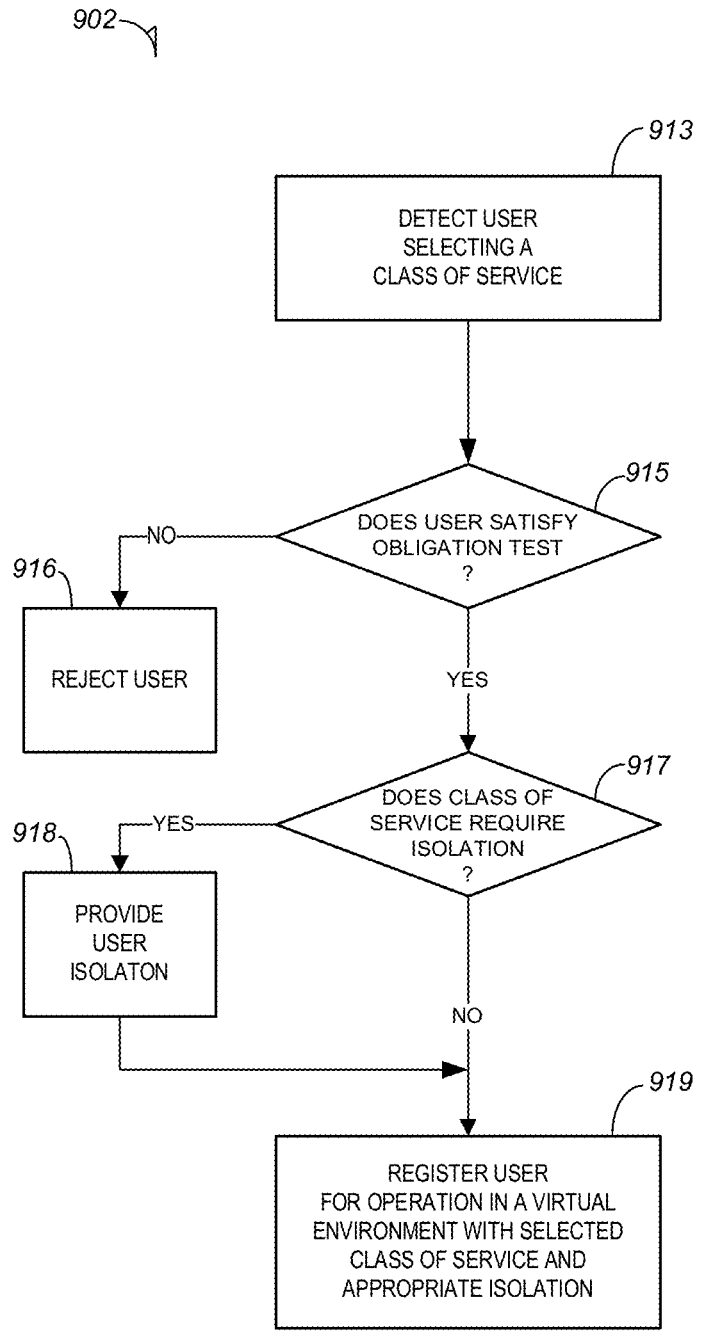
FIG. 9B depicts a flow diagram of a general overview of an exemplary method of detecting users selection of, and allowing a user to operate in, a selected class of service in a cloud.

FIG. 9B depicts a flow diagram 902 of a general overview of an exemplary method of detecting a user selection of, and allowing a user to operate in, a selected class of service in a cloud. At 913 the system detects a user selecting a class of service desired in the cloud. At 915 the system determines the user obligations established for the class of service as discussed with respect to 903 of FIG. 9A and tests to determine whether the user meets or satisfies the obligations of the selected class of service. If the user does not satisfy the obligations, the user is rejected as at 916. If the user does satisfy the user obligations, then a test is made at 917 to determine whether the selected class of service requires isolation, If yes, the user and the appropriate user applications are provided with the required isolation, at operation 918, in an appropriate virtual environment associated with the selected class of service. The user is then registered at 919, that is, provided permission, to operate in the selected class of service in the aforementioned virtual environment. If the class of service does not require isolation as determined in the test 917, then no isolation is provided and the user is then registered at 919 as mentioned in the preceding sentence.

While various embodiments are described with reference to assorted implementations and exploitations, it will be understood that these embodiments are illustrative only and that scope is not limited to them. In general, techniques for cloud infrastructure integration may be implemented with facilities consistent with any hardware system or hardware systems defined herein. Many variations, modifications, additions, and improvements are possible.

Plural instances may be provided for resources, operations, or structures described herein as a single instance. Finally, boundaries between various resources, operations, and data stores are somewhat arbitrary, and particular operations are illustrated in a context of specific illustrative configurations. Other allocations of functionality are envisioned and may fall within a scope of various embodiments. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of the present invention is represented by the appended claims.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Electronic Apparatus and System

Exemplary embodiments may be implemented in analog, digital, or hybrid electronic circuitry, or in computer hardware, firmware, software, or in combinations thereof. Exemplary embodiments may be implemented using a computer program product, for example, a computer program tangibly embodied in an information carrier (e.g., in a machine-readable medium for execution by, or to control the operation of, data processing apparatus, for example, a programmable processor, a computer, or multiple computers).

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In certain exemplary embodiments, operations may be performed by one or more programmable processors executing a computer program to perform functions by operating on input data and generating output. Method operations can also be performed by, and apparatus of exemplary embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various exemplary embodiments.

Exemplary Machine Architecture and Machine-Readable Medium

Figure 10:
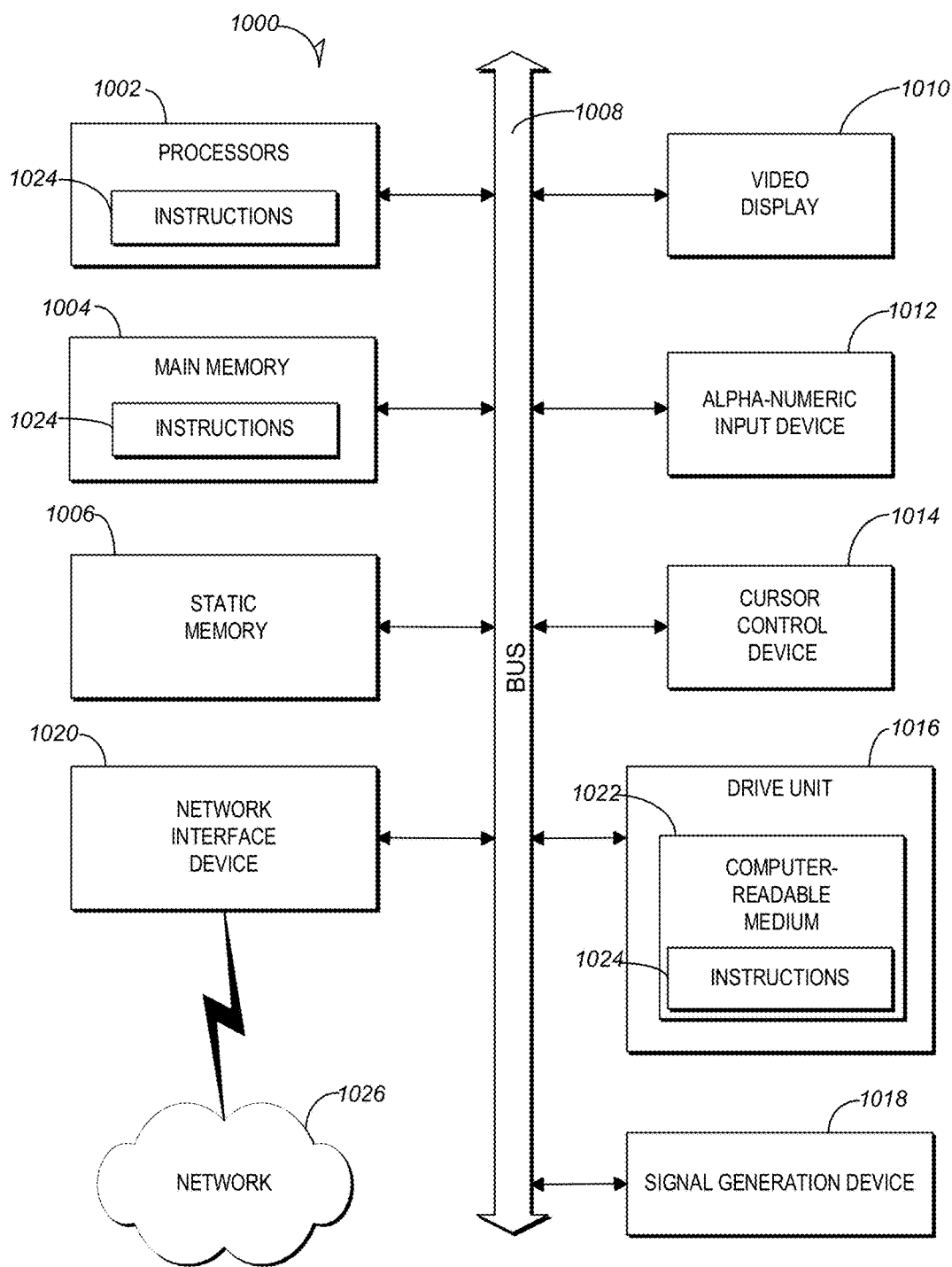
FIG. 10 is a simplified block diagram of a machine in an exemplary form of a computing system within which a set of instructions, for causing the machine to perform any one or more of the methodologies discussed herein, may be executed.

With reference to FIG. 10, an exemplary embodiment extends to a machine in the exemplary form of a computer system 1000 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes one or more processors 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 such as a user interface (UI) navigation device (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 or within the one or more processors 1002 during execution thereof by the computer system 1000; the main memory 1004 and the one or more processors 1002 also constituting machine-readable media.

While the machine-readable medium 1022 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Exemplary Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data input through the interface level. The logic tier may communicate the results of such processing to the interface tier, or to a backend or storage tier. The processing performed by the logic tier may relate to certain rules or processes that govern the software as a whole. A third storage tier may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The exemplary three-tier architecture, and the technologies through which it is implemented, may be realized on one or more computer systems operating, for example, as a standalone system, or organized in a server-client, peer-to-peer, distributed, or some other suitable configuration. Further, these three tiers may be distributed between more than one computer system as various components.

Components

Exemplary embodiments may include the above described tiers, and processes or operations about constituting these tiers may be implemented as components. Common to many of these components is an ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented or object-oriented programming technique can be implemented using a Visual Component Library (VCL), Component Library for Cross Platform (CLX), JavaBeans (JB), Enterprise JavaBeans™ (EJB), Component Object Model (COM), Distributed Component Object Model (DCOM), or any other suitable technique.

Software for these components may further enable communicative coupling to other components (e.g., via various APIs), and may be compiled into one complete server, client, or peer software application. Further, these APIs may be able to communicate through various distributed programming protocols as distributed computing components.

Distributed Computing Components and Protocols

Some exemplary embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques and can be written in the same programming language or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model or Transmission Control Protocol/Internet Protocol (TCP/IP) protocol stack model for defining the protocols used by a network to transmit data.

A System of Transmission Between a Server and Client

Exemplary embodiments may use the OSI model or TCP/IP protocol stack model for defining protocols used by a network to transmit data. In applying these models, a system of data transmission between a server and client, or between peer computer systems, may, for example, include five layers comprising: an application layer, a transport layer, a network layer, a data link layer, and a physical layer. In the case of software for instantiating or configuring components having a three-tier architecture, the various tiers (e.g., the interface, logic, and storage tiers) reside on the application layer of the TCP/IP protocol stack. In an exemplary implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data are transmitted over a network such as an internet, LAN, WAN, or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

Although an embodiment has been described with reference to specific exemplary embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on performance and usability of the internal cloud infrastructure system.

These and various other embodiments are all within a scope of the present invention. The specification and drawings are, accordingly, to be regarded in an illustrative rather than a restrictive sense.

What is claimed is:

1. A method comprising using one or more computer processors and storage:

providing an internal cloud, the internal cloud being connected to a shared system infrastructure via an infrastructure communications interface and connected to two or more existing lines of business (LOBs) via a service communication interface, wherein the LOBs include one or more or a combination of individual business units, individual product lines, and peripheral external business groups, and the shared system infrastructure includes a software asset layer and a physical asset layer that includes existing computers and network systems;

establishing a first virtual environment in the internal cloud, the first virtual environment being configured to be accessed by users of the virtual environment via a network and cloud management system, the first virtual environment providing only a first class of service, the shared system infrastructure being exposed to the users through a virtualization layer, and a first application being implemented in the first virtual environment;

coupling a first LOB of the LOBs to the first application via the service communication interface;

establishing a second virtual environment in the internal cloud, the second virtual environment being configured to be accessed by the users via the network and the cloud management system, the second virtual environment providing only a second class of service, and a second application being implemented in the second virtual environment;

coupling a second LOB of the LOBs to the second application via the service communication interface;

establishing a system-wide communication protocol among the first virtual environment and the second virtual environment;

executing the first application of the first virtual environment according to the first class of service;

executing the second application of the second virtual environment according to the second class of service; and reducing a number of crossings of an application programming interface (API) via which calls are communicated with users to speed up execution of the first application and the second application, wherein:
the first virtual environment includes a first dedicated virtual resource and a first physical resource, the first dedicated virtual resource being created by a cloud management system from the shared system infrastructure;

the second virtual environment includes a second virtual dedicated resource, the second dedicated virtual resource being created by the cloud management system from the shared system infrastructure;

the first dedicated virtual resource and the second dedicated virtual resource share a virtualized physical resource that is included in the internal cloud and not included in the first virtual environment or the second virtual environment;

the first class of service is different from the second class of service;

the first physical resource of the first virtual environment and the virtualized physical resource share physical resources of the shared system infrastructure; and the shared physical resources support both the first class of service and the second class of service.

2. The method of claim 1 wherein there are M classes of service and N virtual environments, where N is greater than M.

3. The method of claim 2, wherein establishing one or both of the first virtual environment and the second virtual environment comprises one or more or a combination of:
    detecting establishment of a user obligation for at least some of the M classes of service;
    detecting establishment of capabilities for the at least some of the M classes of service;
    detecting establishment of a service restriction for the at least some of the M classes of service;
    detecting establishment of compatibility between or among the at least some of the M classes of service; and
    detecting establishment of isolation requirements for the at least some of the one or more first virtual environments and the one or more second virtual environments.

4. The method of claim 2, wherein establishing one or both of the first virtual environment and the second virtual environment comprises detecting establishment of redundancy levels for the at least some of the M classes of service.

5. The method of claim 4, wherein the detecting the establishment of redundancy levels for the at least some of the M classes of service comprises automatically changing a configuration of the shared system infrastructure to provide sufficient redundancy for an application.

6. A machine-readable hardware storage device having embedded therein a set of instructions which, in response to being executed by a system, causes execution of operations comprising:
    using one or more computer processors and storage, providing an internal cloud, the internal cloud being connected to a shared system infrastructure via an infrastructure communications interface and connected to two or more existing lines of business (LOBs) via a service communication interface, wherein the LOBs include one or more or a combination of individual business units, individual product lines, and peripheral external business groups, and the shared system infrastructure includes a software asset layer and a physical asset layer that includes existing computers and network systems;
    establishing a first virtual environment in the internal cloud, the first virtual environment being configured to be accessed by users of the virtual environment via a network and cloud management system, the first virtual environment providing only a first class of service, the shared system infrastructure being exposed to the users through a virtualization layer, and a first application being implemented in the first virtual environment;
    coupling a first LOB of the LOBs to the first application via the service communication interface;
    establishing a second virtual environment in the internal cloud, the second virtual environment being configured to be accessed by the users via the network and the cloud management system, the second virtual environment providing only a second class of service, and a second application being implemented in the second virtual environment;
    coupling a second LOB of the LOBs to the second application via the service communication interface;
    establishing a system-wide communication protocol among the first virtual environment and the second virtual environment;
    executing the first application of the first virtual environment according to the first class of service;
    executing the second application of the second virtual environment according to the second class of service;
and reducing a number of crossings of an application programming interface (API) via which calls are communicated with users to speed up execution of the first application and the second application,
    wherein:
        the first virtual environment includes a first dedicated virtual resource and a first physical resource, the first dedicated virtual resource being created by a cloud management system from the shared system infrastructure;
        the second virtual environment includes a second virtual dedicated resource, the second dedicated virtual resource being created by the cloud management system from the shared system infrastructure;
        the first dedicated virtual resource and the second dedicated virtual resource share a virtualized physical resource that is included in the internal cloud and not included in the first virtual environment or the second virtual environment;
        the first class of service is different from the second class of service; the first physical resource of the first virtual environment and the virtualized physical resource share physical resources of the shared system infrastructure;
        and the shared physical resources support both the first class of service and the second class of service.

7. The machine-readable hardware storage device of claim 6 wherein there are M classes of service and N virtual environments, where N is greater than M.

8. The machine-readable hardware storage device of claim 7, wherein establishing one or both of the first virtual environment and the second virtual environment comprises one or more or a combination of:
    detecting establishment of a user obligation for the at least some of the M classes of service;
    detecting establishment of capabilities for the at least some of the M classes of service;
    detecting establishment of a service restriction for the at least some of the M classes of service; detecting establishment of compatibility between or among the at least some of the M classes of service; detecting establishment of isolation requirements for the at least some of the one or more
first virtual environments and the one or more second virtual environments; and detecting
    establishment of alarm policies for the at least some of the M classes of service.

9. The machine-readable hardware storage device of claim 7, wherein establishing one or both of the first virtual environment and the second virtual environment comprises detecting the establishment of redundancy levels for the at least some of the M classes of service.

10. The machine-readable hardware storage device of claim 9, wherein the detecting the establishment of redundancy levels for the at least some of the M classes of service comprises automatically changing a configuration of the shared system infrastructure to provide sufficient redundancy for an application.

11. A cloud computer system comprising virtual environments having shared resources from a shared system infrastructure, an internal cloud configured to be accessed by users via a network and cloud management system, the system further comprising:
 providing an internal cloud, the internal cloud being connected to a shared system infrastructure via an infrastructure communications interface and connected to two or more existing lines of business (LOBs) via a service communication interface, wherein the LOBs include one or more or a combination of individual business units, individual product lines, and peripheral external business groups, and the shared system infrastructure includes a software asset layer and a physical asset layer that includes existing computers and network systems;
 establishing a first virtual environment in the internal cloud, the first virtual environment being configured to be accessed by users of the virtual environment via a network and cloud management system, first virtual environments provides only a first class of service, the shared system infrastructure being exposed to the users through a virtualization layer, and a first application being implemented in the first virtual environment;
 coupling a first LOB of the LOBs to the first application via the service communication interface;
establishing a second virtual environment in the internal cloud, the second virtual environment being configured to be accessed by the users via the network and the cloud management system, the second virtual environment provides only a second class of service, and a second application being implemented in the second virtual environment;
 coupling a second LOB of the LOBs to the second application via the service communication interface;
 establishing a system-wide communication protocol among the first virtual environment and the second virtual environment;
 executing the first application of the first virtual environment according to the first class of service;
 executing the second application of the second virtual environment according to the second class of service; and
 reducing a number of crossings of an application programming interface (API) via which calls are communicated with users to speed up execution of the first application and the second application,
wherein:
 the first virtual environment includes a first dedicated virtual resource and a first physical resource, the first dedicated virtual resource being created by a cloud management system from the shared system infrastructure;
 the second virtual environment includes a second virtual dedicated resource, the second dedicated virtual resource being created by the cloud management system from the shared system infrastructure;
 the first dedicated virtual resource and the second dedicated virtual resource share a virtualized physical resource that is included in the internal cloud and not included in the first virtual environment or the second virtual environment;
 the first class of service is different from the second class of service;
 the first physical resource of the first virtual environment and the virtualized physical resource share physical resources of the shared system infrastructure;
 and the shared physical resources support both the first class of service and the second class of service.

12. The system of claim 11 wherein there are M classes of service and N virtual environments, where N is greater than M.

13. The system of claim 12, wherein the establishment of the one or both of the first virtual environment and the second virtual environment comprises:
 establishment of a user obligation for the at least some of the M classes of service;
 establishment of capabilities for the at least some of the M classes of service;
 establishment of a service restriction for the at least some of the M classes of service;
establishment of compatibility between or among the at least some of the M classes of service;
 establishment of isolation requirements for the at least some of the one or more first virtual environments and the one or more second virtual environments; and
 establishment of alarm policies for the at least some of the M classes of service.

14. The system of claim 12, wherein establishment of the one or both of the first virtual environment and the second virtual environment comprises establishment of redundancy levels for the at least some of the M classes of service.

15. The system of claim 14, wherein the establishment of redundancy levels for the at least some of the M classes of service comprises automatically changing a configuration of the shared system infrastructure to provide sufficient redundancy for an application.

* * * * *